(12) United States Patent
Tomas

(10) Patent No.: US 8,746,701 B2
(45) Date of Patent: Jun. 10, 2014

(54) PISTON ASSEMBLY

(75) Inventor: Terry A. Tomas, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1049 days.

(21) Appl. No.: 12/788,366

(22) Filed: May 27, 2010

(65) Prior Publication Data

US 2011/0290106 A1  Dec. 1, 2011

(51) Int. Cl.
 *F16J 9/00* (2006.01)
(52) U.S. Cl.
 USPC .............................. 277/435; 277/434; 92/193
(58) Field of Classification Search
 USPC ..................... 277/434, 435, 589; 92/193, 200
 See application file for complete search history.

(56) References Cited

U.S. PATENT DOCUMENTS

| | | | | | |
|---|---|---|---|---|---|
| 1,307,696 | A | * | 6/1919 | Petersen | 277/589 |
| 1,815,418 | A | * | 7/1931 | O'Bryan | 277/435 |
| 1,933,943 | A | * | 11/1933 | Towell | 92/184 |
| 4,023,248 | A | * | 5/1977 | Ozeki et al. | 29/888.012 |
| 4,966,068 | A | * | 10/1990 | Ficht et al. | 92/193 |
| 5,618,048 | A | * | 4/1997 | Moriarty et al. | 277/489 |

FOREIGN PATENT DOCUMENTS

| | | |
|---|---|---|
| DE | 19723047 A1 | 12/1998 |
| GB | 2283555 A | 5/1995 |
| JP | 2010112323 A | 5/2010 |

* cited by examiner

*Primary Examiner* — Christopher Bobish
(74) *Attorney, Agent, or Firm* — Quinn Law Group, PLLC

(57) ABSTRACT

A piston assembly includes an annular body defining a groove, with a ring disposed within the groove. The piston assembly includes a centering device disposed within the groove between an inner face of the ring and a root of the groove. The centering device centers the ring concentrically within the groove when the ring is in an uncompressed condition, prior to installation into a bore of an engine block, to prevent the inner face of the ring from moving radially outward beyond an outer edge of the groove when the ring is in the uncompressed condition.

16 Claims, 4 Drawing Sheets

PISTON ASSEMBLY

TECHNICAL FIELD

The invention generally relates to a piston assembly and a method of assembling an engine including the piston assembly.

BACKGROUND

Reciprocating internal combustion engines include an engine block that defines a plurality of bores. A piston assembly is moveably disposed within and supported by each of the bores. The piston assembly includes a body having an outer surface that defines at least one groove. A split ring defining a ring gap is disposed within each of the grooves. The ring is radially expandable out of the groove and into abutting engagement with the bore.

Prior to installation into the bore, the ring is disposed in an uncompressed condition, and includes an uncompressed diameter that is larger than a diameter of the bore. In order to install the piston assembly into the bore, the ring is compressed into a compressed condition to define a diameter less than the diameter of the bore. Once installed, the ring expands radially into contact with the bore. Just prior to ring compression, an inner face of the ring at a corner facing the gap may become radially disposed outside an outer edge of the groove, which is defined as ring "pop out".

SUMMARY

A piston assembly for an engine of a vehicle is provided. The piston assembly includes an annular body having an outer side surface. The outer side surface defines a groove disposed circumferentially about the annular body. The groove includes an outer edge defining an outer groove diameter, and a root defining an inner groove diameter. The piston assembly further includes a ring disposed within the groove. The ring includes an inner face defining an inner ring diameter, and an outer face defining an outer ring diameter. The piston assembly further includes a centering device disposed within the groove between the inner face of the ring and the root of the groove. The centering device is configured for radially spacing the ring from the root of the groove to prevent the inner face of the ring from moving radially outward beyond the outer edge of the groove when the ring is in an uncompressed condition.

In another aspect, a piston assembly for an engine of a vehicle is provided. The piston assembly includes an annular body having an outer side surface. The outer surface defines a groove disposed circumferentially about the annular body. The groove includes an outer edge defining an outer groove diameter, and a root defining an inner groove diameter. The piston assembly further includes a ring disposed within the groove. The ring includes an inner face defining an inner ring diameter, and an outer face defining an outer ring diameter. The piston assembly further includes a centering device disposed within the groove between the inner face of the ring and the root of the groove. The centering device is configured for radially spacing the ring from the root of the groove to prevent the inner face of the ring from moving radially outward beyond the outer edge of the groove when the ring is in an uncompressed condition. The centering device is moveable radially inward toward the root of the groove during compression of the ring radially inward, toward the root, into a compressed condition.

In another aspect, a method of assembling an engine including a piston assembly having an annular body defining a groove and a ring is provided. The method includes positioning a centering device within the groove. The method further includes positioning the ring within the groove such that the centering device is disposed between an inner face of the ring and a root of the groove, wherein the centering device radially spaces the ring from the root of the groove when the ring is in an uncompressed condition.

Accordingly, the centering device centers the ring within the groove when the ring is in the uncompressed condition, prior to installation of the piston assembly into a bore of an engine block. Having the ring centered within the groove when in the uncompressed condition prevents a gap corner of the ring from becoming radially disposed outside of the groove, thereby preventing ring "pop out" prior to installation of the piston assembly into the bore of the engine block.

The above features and advantages and other features and advantages of the present invention are readily apparent from the following detailed description of the best modes for carrying out the invention when taken in connection with the accompanying drawings.

DETAILED DESCRIPTION

Figure 1:
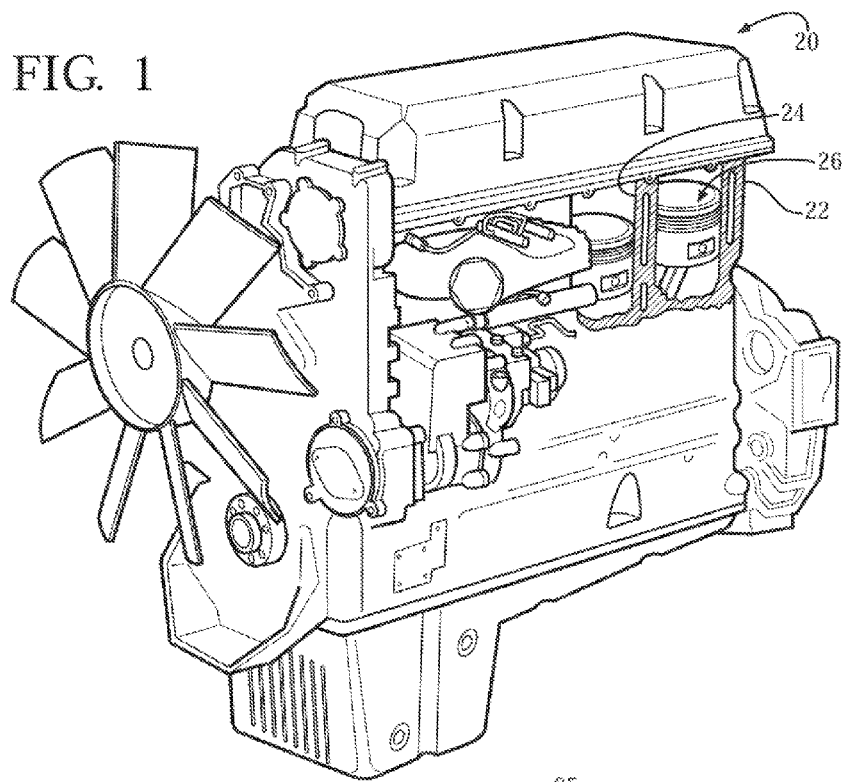
FIG. 1 is a schematic partially cut-away perspective view of an engine.

Referring to the Figures, wherein like numerals indicate corresponding parts throughout the several views, an engine is shown generally at 20. Referring to FIG. 1, the engine 20 includes a block 22 defining at least one bore 24, and a piston assembly 26 moveably disposed within each of the bores 24. The engine 20 may include, but is not limited to, an internal combustion engine 20 having 4, 6, 8 or 10 bores 24, with each bore 24 supporting a piston assembly 26 therein. The piston assemblies 26 reciprocate back and forth within the bores 24 during the ignition/exhaust sequences of the engine 20 as is known. The bores 24 may include any bore 24 diameter suitable for the specific size and/or intended use of the engine 20.

Figure 3:
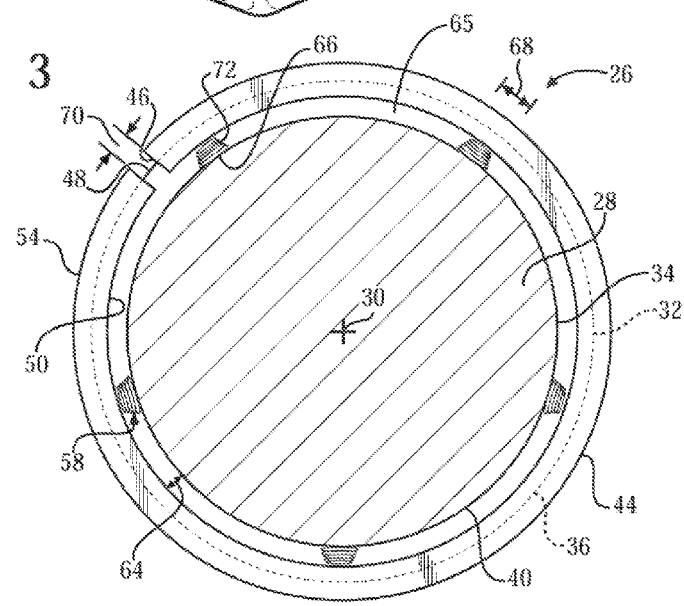
FIG. 3 is a schematic top cross sectional view of the piston assembly along cutline 3-3 shown in FIG. 2, and showing the ring in the uncompressed condition.
Figure 2:
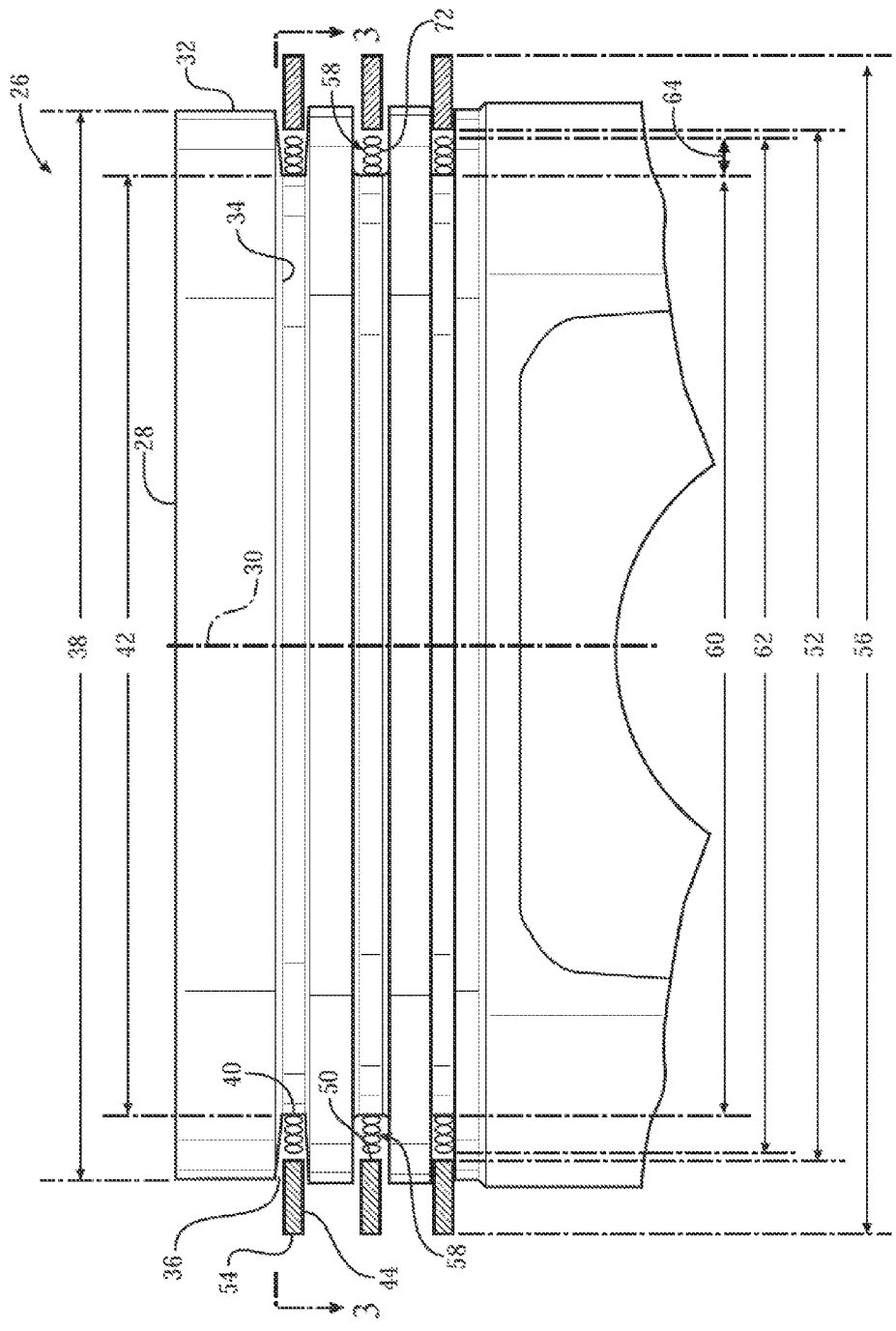
FIG. 2 is a schematic side cross sectional view of a piston assembly for the engine showing a ring in an uncompressed condition.
Figure 4:
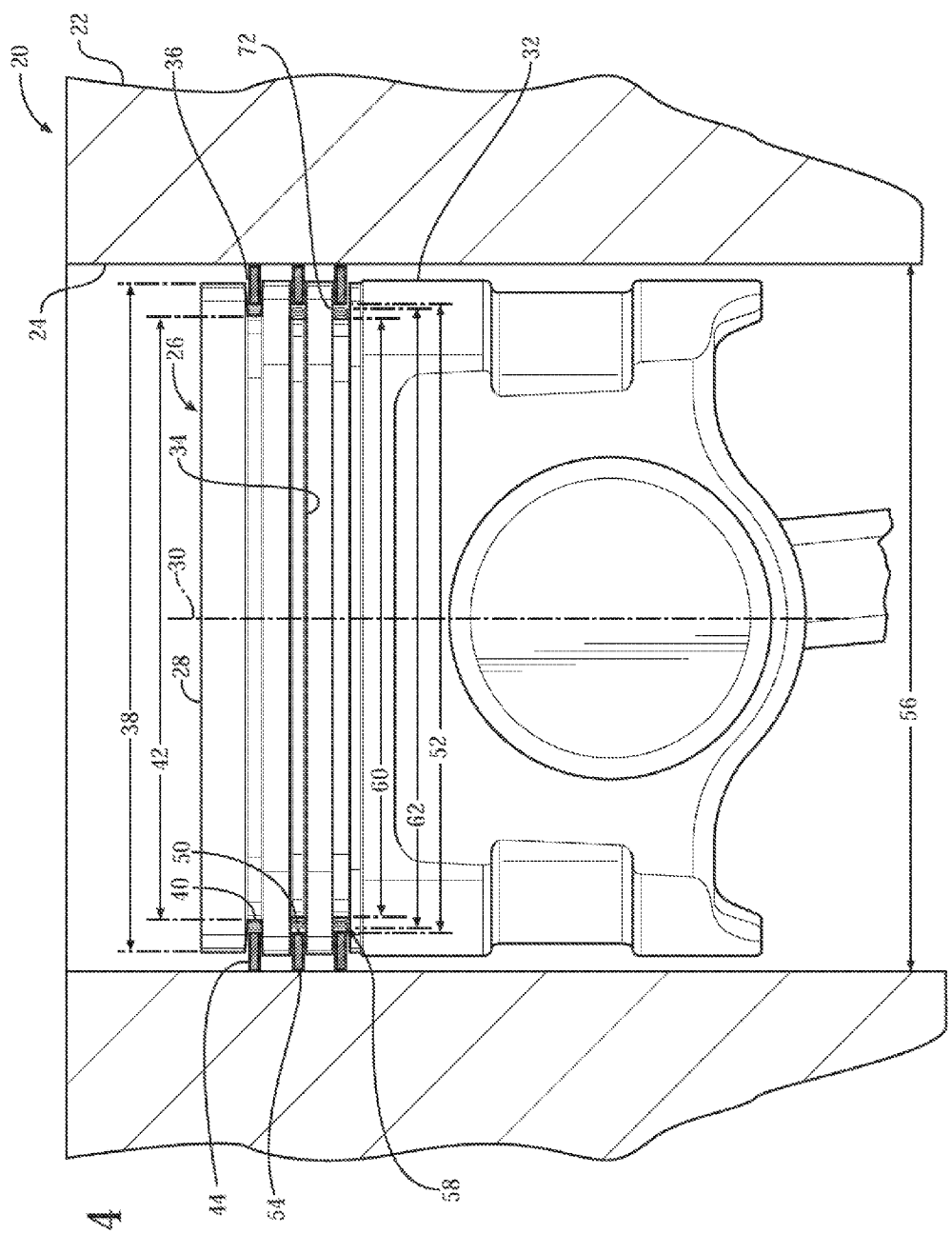
FIG. 4 is a schematic fragmentary cross sectional view of the engine showing the piston assembly disposed within a bore of the engine and the ring in a compressed condition.

Referring to FIGS. 2 through 4, the piston assembly 26 includes an annular body 28 having a center disposed along a longitudinal axis 30. The annular body 28 includes an outer side surface 32 defining at least one groove 34, which is disposed circumferentially about the annular body 28, and concentric with the longitudinal axis 30. The groove 34 includes an outer groove edge 36 defining an outer groove diameter 38, and a root 40 defining an inner groove diameter 42. Typically, and as shown, the annular body 28 includes three grooves 34 axially spaced from each other along the longitudinal axis 30. However, it should be appreciated that the number of grooves 34 may differ from that shown and described herein.

The piston assembly 26 further includes at least one ring 44, with one ring 44 disposed within each of the grooves 34. Accordingly, it should be appreciated that piston assembly 26 includes a corresponding number of rings 44 and grooves 34. The ring 44 includes a cut 46 defining a gap 48 extending radially across the ring 44. Accordingly, the ring 44 includes a non-continuous substantially circular shape perpendicular to the longitudinal axis 30. The cut 46 in the ring 44 permits the radial compression of the ring 44 from an uncompressed condition into a compressed condition. The ring 44 includes an inner face 50 defining an inner ring diameter 52, and an outer face 54 defining an outer ring diameter 56. The ring 44 is normally biased to the uncompressed condition. When in the uncompressed condition, the ring 44 is sized so that the outer ring diameter 56 is greater than the bore 24 diameter of the bore 24. When compressed into the compressed condition, the ring 44 includes an outer ring diameter 56 substantially equal to the bore 24 diameter, and biases outward against the bore 24 to seal against the bore 24. Accordingly, it should be appreciated that the outer ring diameter 56 of the ring 44 when in the compressed condition is less than the outer ring diameter 56 of the ring 44 when in the uncompressed condition. Similarly, it should be appreciated that the inner ring diameter 52 also changes between the compressed condition and the uncompressed condition, with the inner ring diameter 52 when the ring 44 is in the uncompressed condition being greater than the inner ring diameter 52 when the ring 44 is in the compressed condition.

The depth of the groove 34, i.e., the radial distance between the outer groove edge 36 and the root 40, is greater than a width of the ring 44, i.e., the radial distance between the inner face 50 of the ring 44 and the outer face 54 of the ring 44. Additionally, the outer ring diameter 56 of the ring 44 when in the uncompressed condition is greater than the outer groove diameter 38.

The piston assembly 26 further includes a centering device 58. The centering device 58 is disposed within the groove 34, between the inner face 50 of the ring 44 and the root 40 of the groove 34. The centering device 58 defines an inner device diameter 60 that is greater than the inner groove diameter 42. Additionally, the centering device 58 defines an outer device diameter 62 that is less than the inner ring diameter 52 when the ring 44 is in the uncompressed condition. The centering device 58 is configured for radially spacing the ring 44 from the root of the groove 34 to prevent the inner face 50 of the ring 44 from moving radially outward beyond the outer edge of the groove 34 when the ring 44 is in the uncompressed condition. Accordingly, the centering device 58 substantially centers the ring 44 concentrically with the longitudinal axis 30 of the annular body 28 and relative to the groove 34. By centering the ring 44, when the ring 44 is in the uncompressed condition, within the groove 34, the centering device 58 prevents a corner of the inner face 50 of the ring 44 at the gap 48 from catching on the outer groove edge 36, and thereby prevents ring "pop out", which may lead to problems assembling the piston assembly 26 into the bore 24.

The centering device 58 includes a radial thickness 64 between the inner device diameter 60 and the outer device diameter 62 that is less than one half (½) the difference between the inner groove diameter 42 and the inner ring diameter 52 when the ring 44 is in the uncompressed condition. For example, the centering device 58 may include a radial thickness 64 between the inner device diameter 60 and the outer device diameter 62 that is approximately one millimeter (1 mm) less than one half (½) the difference between the inner groove diameter 42 and the inner ring diameter 52 when the ring 44 is in the uncompressed condition. Accordingly, the ring 44 may move slightly within the groove 34, about the centering device 58, to ensure that the rings 44 are properly installed within the groove 34, yet sufficiently restricted from movement to ensure that a corner of the inner face 50 of the ring 44 at the gap 48 is not radially disposed outside the outer groove edge 36 to prevent dislodgment of the ring 44 from the groove 34.

The centering device 58 is moveable, i.e., compressible, radially inward toward the root 40 of the groove 34 during compression of the ring 44 radially inward, toward the root 40, into a compressed condition. In other words, as the ring 44 is compressed from the uncompressed condition into the compressed condition during installation of the piston assembly 26 into the bore 24, the ring 44 compresses the centering device 58, thereby allowing the proper radial compression of the ring 44 within the groove 34. Additionally, the centering device 58 is soluble in an engine lubricant above a temperature of at least one hundred fifty degrees Fahrenheit (150° F.). The engine lubricant may include, but is not limited to, motor oil. Because the centering device 58 is only soluble in the engine lubricant at temperatures at or above one hundred fifty degrees Fahrenheit (150° F.), the centering device 58 remains stable during assembly of the piston assembly 26 and initial shipping of the piston assembly 26 and or engine 20, even in high temperature locals, and then quickly dissolves in the engine lubricant once the engine 20 is started and the internal temperature of the engine 20 and engine lubricant rises above one hundred fifty degrees Fahrenheit (150° F.). Furthermore, the centering device 58 may include a stickiness sufficient to adhere the centering device 58 to a flank 65, i.e., a side, of the groove 34 until the ring 44 is compressed into the compressed condition during installation into the bore 24, and a sufficient hardness or stiffness to ensure that the centering device 58 is not prematurely compressed during shipment of the piston assembly 26, prior to installation of the piston assembly 26 in the bore 24.

The centering device 58 may include a wax material. However it should be appreciated that the centering device 58 is not limited to the wax material, and may include any material that is easily compressible, yet stiff enough to withstand contact with the ring 44 during shipping conditions and maintain proper ring 44 alignment, soluble in the engine lubricant at temperatures at or above one hundred fifty degrees Fahrenheit (150° F.), and may include sufficient stickiness to adhere to the flank 65 of the groove 34 until the ring 44 is compressed into the compressed condition.

The centering device 58 may include, for example, a plurality of segments 66 concentrically spaced within the groove 34 and angularly spaced relative to each other about the groove 34. Each of the segments 66 may include a circumferential length 68 relative to the groove 34 that is larger than the gap 48 when the ring 44 is in the uncompressed condition. For example, each of the segments 66 may include a circumferential length 68 relative to the groove 34 that is at least four millimeters (4 mm) larger than a distance 70 of the gap 48 when the ring 44 is in the uncompressed condition. This ensures that the segments 66 of the centering device 58 are sufficiently long to span across the gap 48 of the ring 44 when the ring 44 is in the uncompressed condition. Additionally, the centering device 58 may include a plurality of beads 72 stacked radially within the groove 34 relative to each other. For example, the centering device 58 may include four beads 72 having a radial thickness 64 of 0.5 mm each stacked radially within the groove 34. While the centering device 58 is herein described and shown as including the plurality of segments 66 concentrically spaced within the groove 34 and angularly spaced relative to each other about the groove 34, with each of the segments 66 including the plurality of beads 72 stacked radially within the groove 34 relative to each other, it should be appreciated that the centering device 58 may be configured in some other manner not shown or described herein that is capable of spacing the ring 44 from the root 40 of the groove 34 prior to installation of the piston assembly 26 into the block 22, and that does not interfere with operation of the engine 20.

Figure 5:
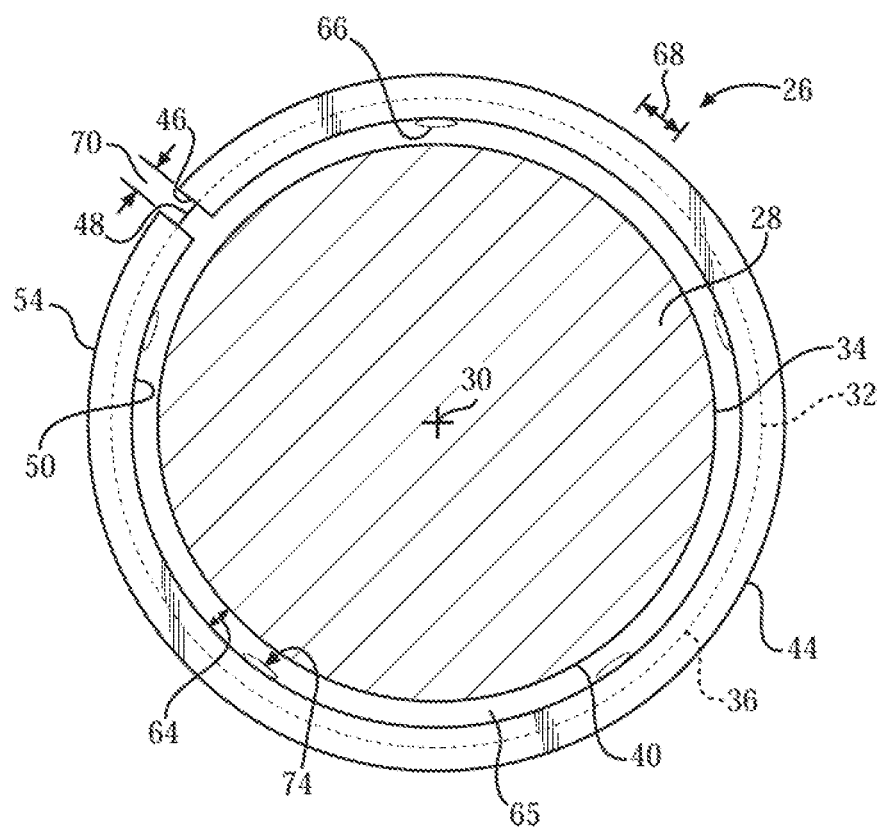
FIG. 5 is a schematic top cross sectional view of an alternative embodiment of the piston assembly showing the ring in the uncompressed condition.

Referring to FIG. 5, an alternative embodiment of the centering device is shown generally at 74. The centering device 74 includes a plurality of segments 66 concentrically spaced within the groove 34, about the longitudinal axis 30, and angularly spaced relative to each other about the groove. Each of the segments may include a circumferential length 68 relative to the groove 34 that is larger than the gap 48 when the ring 44 is in the uncompressed condition. Each of the segments 66 are adhered by the inherent stickiness of the centering device 74 to a flank 65, i.e., a side, of the groove 34. Accordingly, during compression of the ring 44, each of the segments 66 are moved, i.e., pushed, radially inward without compressing toward the root of the groove 34.

In another aspect of the invention, a method of assembling the engine 20 is provided. The method of assembling the engine 20 includes positioning the centering device 58 within the groove 34 of the annular body 28. The centering device 58 may be positioned within the groove 34 in any suitable manner, either manually or automatically by machine. If the centering device 58 includes a wax as described above, then the centering device 58 may be deposited by a dispensing machine into the groove 34 in the configuration described above.

The method further includes positioning the ring 44 within the groove 34 such that the centering device 58 is disposed between the inner face 50 of the ring 44 and the root 40 of the groove 34. The ring 44 is initially positioned when in the uncompressed condition, with the centering device 58 radially spacing the ring 44 from the root 40 of the groove 34, i.e., the centering device 58 substantially aligns the ring 44 concentrically relative to the groove 34 and the longitudinal axis 30. Accordingly, the centering device 58 maintains the relative position of the ring 44 within the groove 34 to ensure the ring 44 does not shift laterally out of the groove 34 and become dislodged during transit or before installation into the block 22.

The method further includes radially compressing the ring 44 and the centering device 58 into the groove 34 to permit installation of the piston assembly 26 into the bore 24 of the engine block 22. The ring 44 may be compressed from the uncompressed condition into the compressed condition in any suitable manner, such as but not limited to, manually compressing the ring 44 using a ring clamp, or automatically compressing the ring 44 using an automated stuffing machine, such as is common in large scale assembly line processes.

The method further includes installing the piston assembly 26 within the bore 24 after the ring 44 has been compressed from the uncompressed condition into the compressed condition. Once the ring 44 is compressed into the compressed condition, the outer ring diameter 56 is smaller than the bore 24 diameter, thereby allowing the piston assembly 26 to slide into the bore 24 of the block 22. The piston assembly 26 may be installed into the bore 24 by any suitable method, either manually or by machine.

The method further includes heating the centering device 58 in the presence of an engine lubricant to dissolve the centering device 58 in the engine lubricant after installation into the bore 24 of the engine block 22. The heating may be achieved, for example, by operating the engine 20 once assembled and installed in the vehicle. As the engine 20 operates, the engine 20 generates heat, thereby heating the block 22 and the engine lubricant, once the engine lubricant reaches or rises above one hundred fifty degrees Fahrenheit (150° F.) for the first time, the centering device 58 dissolves into the engine lubricant and flushed from the groove 34. It should be appreciated that heating the centering device 58 may alternatively be accomplished in some other manner not described herein.

While the best modes for carrying out the invention have been described in detail, those familiar with the art to which this invention relates will recognize various alternative designs and embodiments for practicing the invention within the scope of the appended claims.

The invention claimed is:

1. A piston assembly for an engine of a vehicle, the piston assembly comprising:
   an annular body having an outer side surface defining a groove disposed circumferentially about the annular body, the groove including an outer edge defining an outer groove diameter, and a root defining an inner groove diameter;
   a ring disposed within the groove and having an inner face defining an inner ring diameter, and an outer face defining an outer ring diameter; and
   a centering device disposed within the groove between the inner face of the ring and the root of the groove, wherein the centering device is configured for radially spacing the ring from the root of the groove to prevent the inner face of the ring from moving radially outward beyond the outer edge of the groove when the ring is in an uncompressed condition;
   wherein the centering device includes a radial thickness between the inner device diameter and the outer device diameter that is less than one half (½) the difference between the inner groove diameter and the inner ring diameter when the ring is in the uncompressed condition; and
   wherein the centering device includes a plurality of beads stacked radially within the groove relative to each other.

2. A piston assembly as set forth in claim 1 wherein the centering device defines an inner device diameter greater than the inner groove diameter and an outer device diameter less than the inner ring diameter when the ring is in the uncompressed condition.

3. A piston assembly as set forth in claim 2 wherein the centering device is moveable radially inward toward the root of the groove during compression of the ring radially inward, toward the root, into a compressed condition.

4. A piston assembly as set forth in claim 3 wherein the centering device includes a plurality of segments concentrically spaced within the groove and angularly spaced relative to each other about the groove.

5. A piston assembly as set forth in claim 4 wherein the ring includes a cut defining a gap extending radially across the ring, and wherein each of the segments includes a circumferential length relative to the groove that is larger than the gap when the ring is in the uncompressed condition.

6. A piston assembly as set forth in claim 1 wherein the centering device is soluble in an engine lubricant above a temperature of at least one hundred fifty degrees Fahrenheit (150° F.).

7. A piston assembly as set forth in claim 1 wherein the centering device includes a wax material.

8. A piston assembly for an engine of a vehicle, the piston assembly comprising:
- an annular body having an outer side surface defining a groove disposed circumferentially about the annular body, the groove including an outer edge defining an outer groove diameter, and a root defining an inner groove diameter;
- a ring disposed within the groove and having an inner face defining an inner ring diameter, and an outer face defining an outer ring diameter; and
- a centering device disposed within the groove between the inner face of the ring and the root of the groove and configured for radially spacing the ring from the root of the groove to prevent the inner face of the ring from moving radially outward beyond the outer edge of the groove when the ring is in an uncompressed condition, wherein the centering device is moveable radially inward toward the root of the groove during compression of the ring radially inward, toward the root, into a compressed conditions;
- wherein the centering device includes a wax material, and a plurality of beads stacked radially within the groove relative to each other.

9. A piston assembly as set forth in claim 8 wherein the centering device defines an inner device diameter and an outer device diameter, wherein the inner device diameter is greater than the inner groove diameter and the outer device diameter is less than the inner ring diameter.

10. A piston assembly as set forth in claim 8 wherein the centering device is soluble in an engine lubricant above a temperature of at least one hundred fifty degrees Fahrenheit (150° F.).

11. A piston assembly as set forth in claim 8 wherein the ring includes a cut defining a gap extending radially across the ring and wherein the centering device includes a plurality of segments concentrically spaced within the groove and angularly spaced relative to each other about the groove, with each of the segments including a circumferential length relative to the groove that is at least four millimeters (4 mm) larger than the gap when the ring is in the uncompressed condition.

12. A method of assembling an engine including a piston assembly having an annular body defining a groove and a ring, the method comprising:
- positioning a centering device within the groove, wherein the centering device is comprised of a plurality of beads stacked radially within the groove relative to each other; and
- positioning the ring within the groove such that the centering device is disposed between an inner face of the ring and a root of the groove, wherein the centering device radially spaces the ring from the root of the groove when the ring is in an uncompressed condition.

13. A method as set forth in claim 12 wherein the engine includes an engine block defining a bore and the method further includes installing the piston assembly within the bore.

14. A method as set forth in claim 13 wherein installing the piston assembly further includes radially compressing the ring and the centering device into the groove to permit installation of the piston assembly into the bore of the engine block.

15. A method as set forth in claim 14 wherein the method further includes heating the centering device in the presence of an engine lubricant to dissolve the centering device in the engine lubricant.

16. A method as set forth in claim 15 wherein heating the centering device is further defined as heating the centering device to a temperature greater than hundred fifty degrees Fahrenheit (150° F.).

* * * * *